United States Patent
Harigae

(10) Patent No.: US 9,055,203 B2
(45) Date of Patent: Jun. 9, 2015

(54) IMAGE FORMING APPARATUS AND STORAGE METHOD OF PRINT DATA

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Makoto Harigae, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/078,915

(22) Filed: Nov. 13, 2013

(65) Prior Publication Data

US 2015/0131120 A1    May 14, 2015

(51) Int. Cl.
*G06K 15/02* (2006.01)
*H04N 1/21* (2006.01)
*H04N 1/00* (2006.01)
*H04N 1/44* (2006.01)

(52) U.S. Cl.
CPC ............ *H04N 1/21* (2013.01); *H04N 1/00209* (2013.01); *H04N 1/00347* (2013.01); *H04N 1/00477* (2013.01); *H04N 1/00408* (2013.01); *H04N 1/4433* (2013.01); *H04N 2201/0094* (2013.01); *H04N 2201/214* (2013.01); *H04N 2201/218* (2013.01)

(58) Field of Classification Search
USPC .......................................................... 358/1.15
See application file for complete search history.

(56) References Cited

U.S. PATENT DOCUMENTS

| | | | |
|---|---|---|---|
| 2009/0002733 A1* | 1/2009 | Kakigi | 358/1.9 |
| 2011/0273738 A1* | 11/2011 | Tanaka et al. | 358/1.14 |
| 2014/0211236 A1* | 7/2014 | Kasuga et al. | 358/1.14 |

* cited by examiner

*Primary Examiner* — Qian Yang
(74) *Attorney, Agent, or Firm* — Amin, Turocy & Watson, LLP

(57) ABSTRACT

Generally, in accordance with one embodiment, an image forming apparatus comprises a communication section, a storage section, an operation section, an image forming section, and a controller. The communication section receives print data. The storage section stores print data in a print data area. The operation section receives an operation input. The image forming section forms, if the operation section receives a printing instruction of print data, an image on a sheet based on the print data. The controller moves the print data which are not printed even a given period has passed since the print data is received by the communication section from a print data area to other storage area.

7 Claims, 5 Drawing Sheets

IMAGE FORMING APPARATUS AND STORAGE METHOD OF PRINT DATA

FIELD

Embodiments described herein relate to a storage technology of print data.

BACKGROUND

When printing print data in an image forming apparatus, a user sends print data from a PC (Personal Computer) to an image forming apparatus, then goes to the apparatus serving as the sending destination to print the print data. The image forming apparatus stores the print data if the print data is received from the PC. The image forming apparatus carries out a printing operation if a printing instruction is received from the user, and then deletes the print data.

Conventionally, the image forming apparatus deletes the print data which are not printed in a given period in the stored print data.

However, there exists a case where a user sends print data to the image forming apparatus but forgets to print the print data. In this case, if the print data are deleted from the PC, a problem exists that the user cannot print the print data.

BRIEF DESCRIPTION OF THE DRAWINGS

FIG. 3 is a flowchart illustrating a storage processing of print data in a case where there are moved print data when a user logs in;

DETAILED DESCRIPTION

Generally, in accordance with one embodiment, an image forming apparatus comprises a communication section, a storage section, an operation section, an image forming section, and a controller. The communication section receives print data. The storage section stores print data in a print data area. The operation section receives an operation input. The image forming section forms an image on a sheet based on the print data if the operation section receives a printing instruction of the print data. The controller moves the print data which are not printed even a given period has passed since the print data is received by the communication section from a print data area to other storage area.

Generally, in accordance with one embodiment, a storage method of print data based on an image forming apparatus which is provided with a storage section for storing print data in a print data area and an operation section for receiving an operation input includes receiving print data; forming an image on a sheet based on the print data if the operation section receives a printing instruction of the print data; moving the print data which are not printed even a given period has passed since the print data is received from a print data area to other storage area.

Hereinafter, embodiments are described with reference to accompanying drawings.

Figure 1:
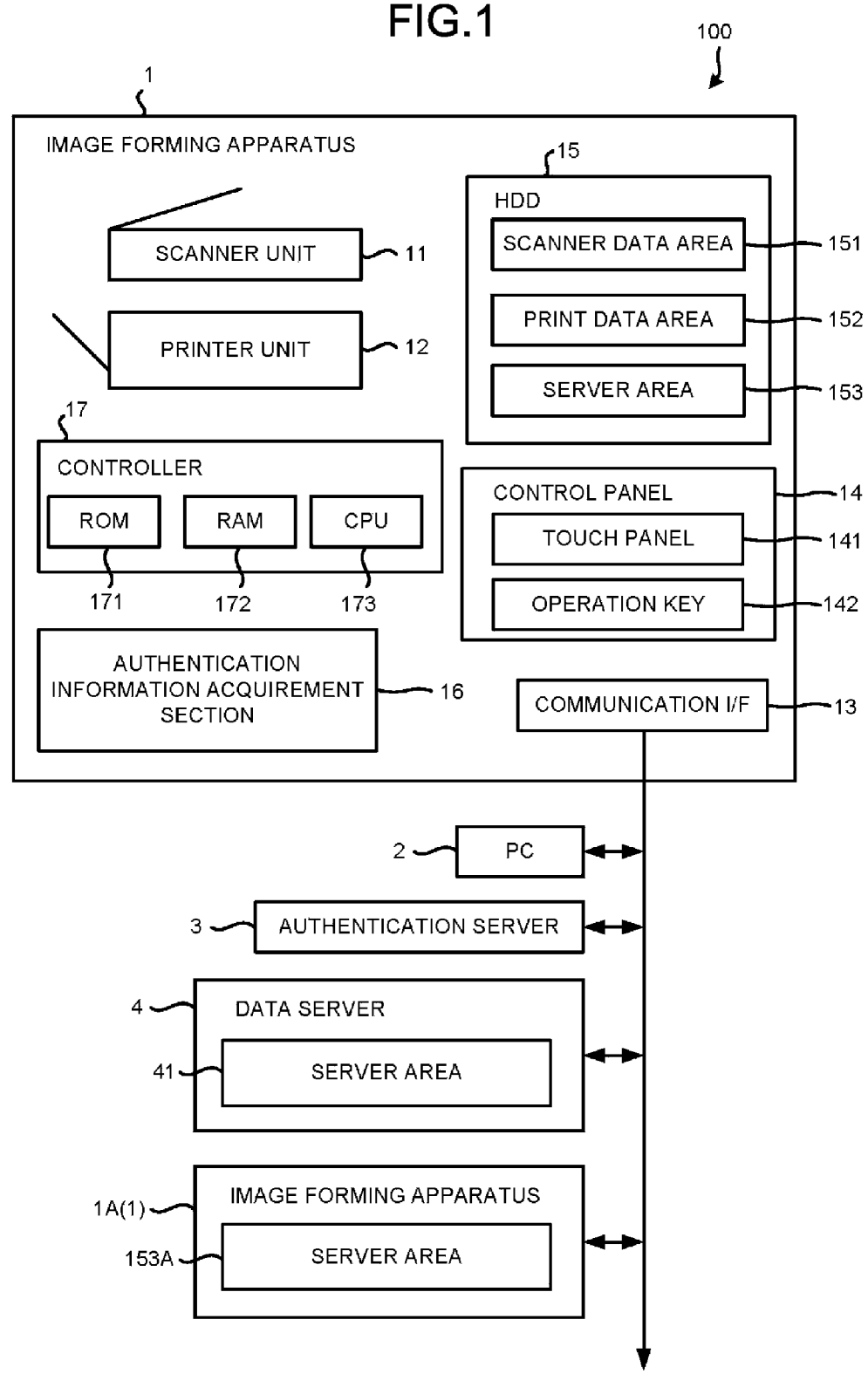
FIG. 1 is a block diagram of a printing system.

FIG. 1 is a block diagram of a printing system 100.

The printing system 100 comprises a plurality of image forming apparatuses 1, a PC 2, an authentication server 3 and a data server 4. Hereinafter, in order to distinguish the image forming apparatus serving as a sending destination of the print data from a user and the image forming apparatus different from the image forming apparatus serving as a sending destination, the image forming apparatus serving as a sending destination is represented by 1, and the image forming apparatus different from the image forming apparatus serving as a sending destination is represented by 1A.

The image forming apparatus 1 is a MFP (Multi Function Peripheral) having a plurality of functions such as a scanning function and a printing function. The image forming apparatus 1 comprises a scanner unit 11, a printer unit 12 (image forming section), a communication I/F 13 (Interface: communication section), a control panel 14, an HDD 15 (Hard Disk Drive: storage section), an authentication information acquirement section 16 and a controller 17.

The scanner unit 11 reads an original and stores image data in the HDD 15.

The printer unit 12 forms an image on a sheet based on the image data read by the scanner unit 11 or the print data received from a PC 2.

The communication I/F 13 is used for the controller to carry out data communication with external apparatuses 2-4 such as the PC 2.

The control panel 14 comprises a touch panel 141 (display and operation section) and an operation key 142 (operation section). The control panel 14 displays setting information of the image forming apparatus 1 and an operation status, log information, and a notification to a user on the touch panel 141. Further, the control panel 14 receives an operation input from a user, and receives an instruction of function operation of the image forming apparatus 1 such as a printing instruction using the touch panel 141 and the operation key 142.

The HDD 15 comprises a scanner data area 151, a print data area 152 and a server area 153. The scanner data area 151 temporarily stores the image data read by the scanner unit 11. The print data area 152 temporarily stores the print data received from the PC 2. The controller 17 deletes the image data and the print data in each area 151, 152 from the areas 151, 152 if a job using the image data and the print data in each area 151, 152 is executed.

The storage capacity of the scanner data area 151 is set to be different from that of the print data area 152, for example, the scanner data area 151 is set to be 100 MB, and the print data area 152 is set to be 50 MB.

The server area 153 can be used as a file server.

The authentication information acquirement section 16 is a card reader for acquiring the authentication information of a user from a card if the card such as a member identification card from the user is put in front of the authentication information acquirement section 16.

The controller 17 comprises a ROM 171 (Read Only Memory), a RAM 172 (Random Access Memory) and a CPU 173 (Central Processing Unit). The ROM 171 stores various control programs. The RAM 172 provides a temporary work area to the CPU 173. The CPU 173 realizes various functions by executing the programs stored in the ROM 171 and the RAM 172.

The controller 17 controls the whole image forming apparatus 1. The controller 17 discloses the server area 153 as a data server, and makes the server area 153 accessible to a data server 4 connected with the image forming apparatus 1 through a network and other image forming apparatus 1A.

Other image forming apparatus 1A also has the same constitution as the image forming apparatus 1, and comprises a server area 153A accessible to the image forming apparatus 1 and the data server 4.

The PC 2 sends the print data to the image forming apparatus 1 according to an operation from a user who carried out a login authentication.

The authentication server 3 receives authentication information from the image forming apparatus 1 and the PC 2, determines whether or not the authentication is proper, and sends back the determination to the image forming apparatus 1 and the PC 2.

The data server 4 comprises a server area 41 accessible to the image forming apparatus 1 and 1A, and stores data in the server area 41.

Figure 2:
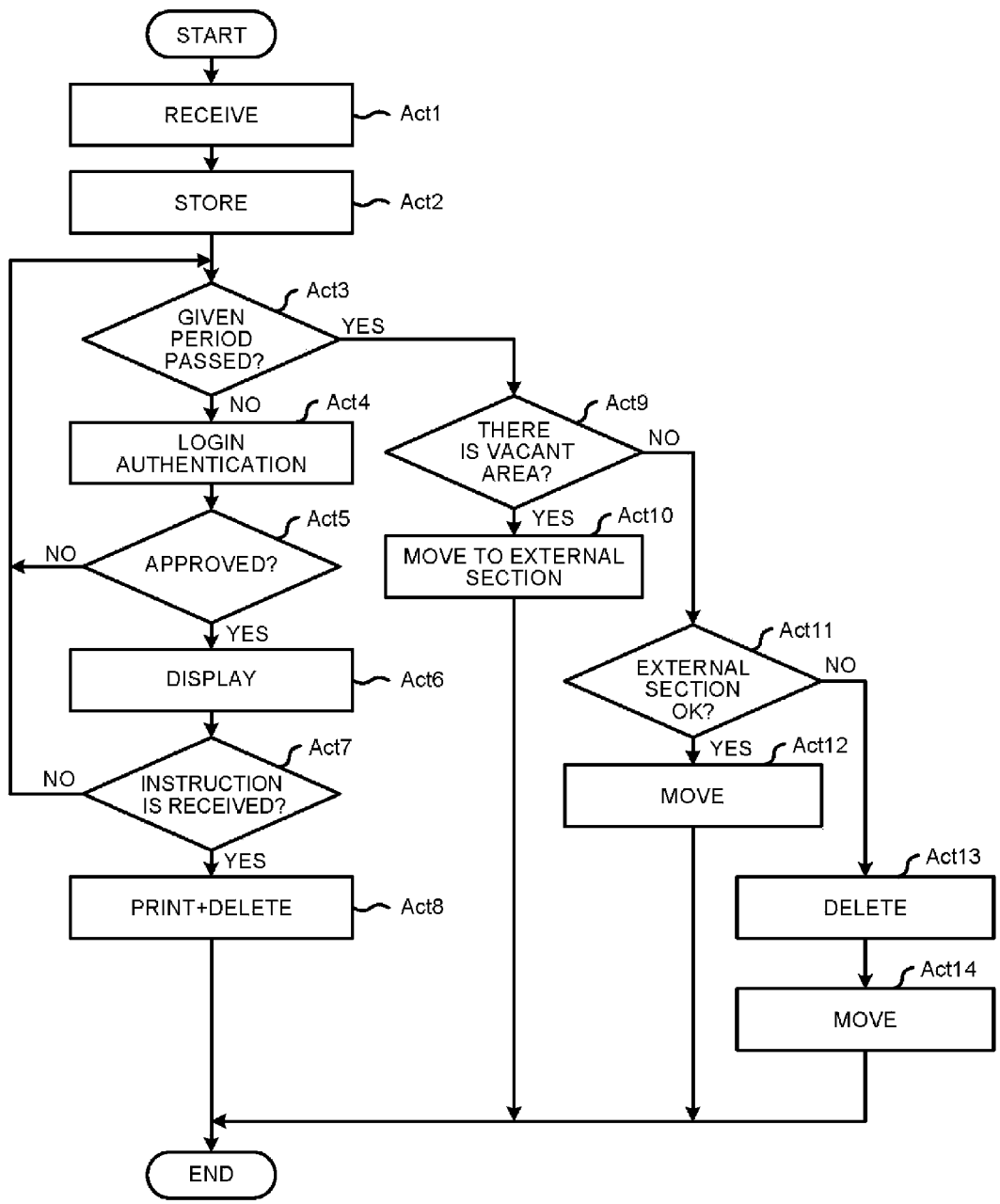
FIG. 2 is a flowchart illustrating a storage processing of print data in a case where a user prints the print data in a given period after sending the print data to an image forming apparatus.

Hereinafter, the storage processing of the print data based on the image forming apparatus 1 in a case where a user prints the print data in a given period after sending the print data to the image forming apparatus 1 is described with reference to a flowchart in FIG. 2.

The controller 17 of the image forming apparatus 1 receives print data and identification information of a user from the PC 2 which approves logging in of the user (ACT 1).

The controller 17 stores the received print data in the print data area 152 of the HDD 15 in association with the identification information of the user (ACT 2).

The controller 17 determines whether or not a given period has passed since the print data of the print data area 152 is received (ACT 3).

The controller 17 leaves the print data stored in the print data area 152 if the given period has not passed since the print data is received (NO in ACT 3).

The user, if desiring to print, goes to the image forming apparatus 1 serving as the sending destination of the print data, and prints the print data after receiving the login authentication of the image forming apparatus 1.

The controller 17 acquires the authentication information of the user and carries out login authentication (ACT 4). Specifically, the controller 17 acquires the authentication information of the user from the card of the user put in front of the authentication information acquirement section 16, or acquires the authentication information such as an ID and a pass word through the control panel 14. The controller 17 outputs the authentication information to the authentication server 3, and approves the logging in of the user if receiving a proper response (YES in ACT 5).

The controller 17 displays a list of the print data in the print data area 152 associated with the identification information of the user according to the operation input received by the control panel 14 (ACT 6). If receiving a selection of print data and a printing instruction of the print data (YES in ACT 7), the controller 17 carries out a printing operation based on the print data desired to be printed, and then deletes the print data from the print data area 152 (ACT 8).

If the print data are not printed even the given period has passed since the print data is received (YES in ACT 3), and if there is vacant area in the server area 153 (YES in ACT 9), the controller 17 moves the print data which are not printed even the given period has passed from the print data area 152 to the server area 153 (ACT 10).

If there is no vacant area in the server area 153 (NO in ACT 9), the controller 17 checks whether or not there is vacant area in the server areas 41, 153A of the data server 4 and other image forming apparatus 1A (ACT 11).

If there is vacant area in other server areas 41, 153A (YES in ACT 11), the controller 17 moves the print data which are not printed even the given period has passed to the server areas 41, 153A in which vacant area exists (ACT 12). Moreover, if vacant areas exist in a plurality of server areas 41, 153A, the controller 17 determines the moving destination of the print data according to a set priority order.

If there is no vacant area in both server areas 41 and 153A (NO in ACT 11), the controller 17 deletes the print data in the server areas 41, 153A serving as the moving destination as much as the capacity of the print data to be moved (the print data which are nor printed even the given period has passed) to guarantee a storage area for storing the print data to be moved (ACT 13).

The priority order of the data to be deleted is set in advance. For example, in the two server areas 41, 153A, the controller 17 takes the one that includes the oldest print data in all the print data in the server areas 41, 153A as the deleting target. Then the controller 17 deletes the print data as much as the capacity of the print data which are not printed even the given period has passed in an order from the oldest print data then to the second oldest print data in the server areas 41, 153A.

Further, for example, in the two server areas 41 and 153A, the controller 17 may also take the one that includes the least important print data in all the print data in the server areas 41, 153A as the deleting target. Then the controller 17 deletes the print data as much as the capacity of the print data to be moved in an order from the least important print data then to the second least important print data in the server areas 41, 153A. If the least important print data exist in both of the server areas 41 and 153A, the controller 17 determines the server area 41 or the server area 153A to be the deleting target according to the setting of the priority order. And it is the same if a plurality of least important print data exist in the server area 41 or 153A serving as the deleting target.

The controller 17 associates the information representing that the print data is moved out from the print data area 152 and a user name with the print data, and moves the print data to other server areas 41, 153A (ACT 14).

Figure 3:
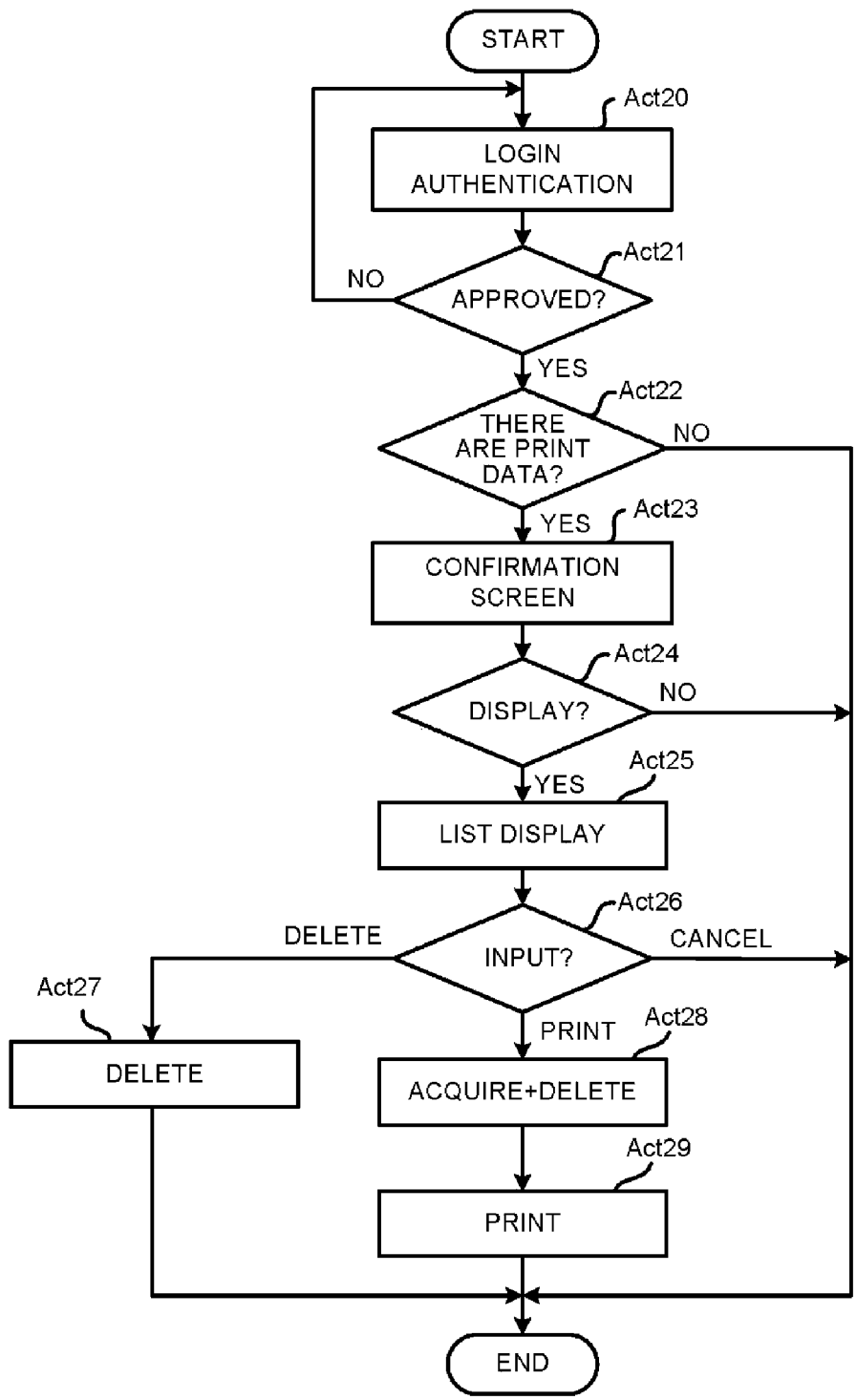
Figure 4:
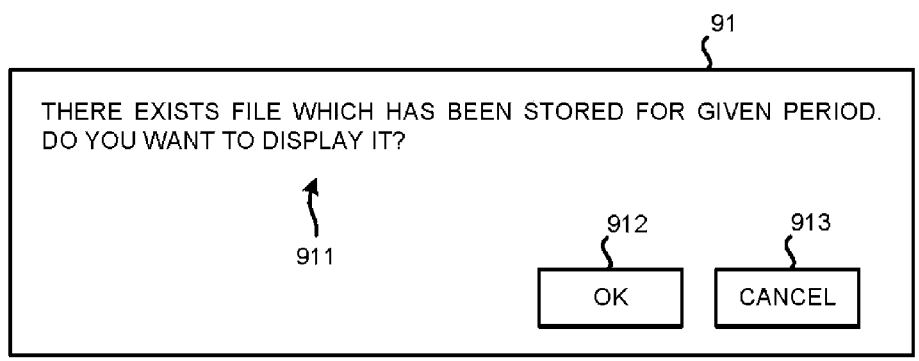
FIG. 4 is a diagram illustrating a confirmation screen.

Next, a processing in a case where there are print data moved to other server areas 41, 153A when a user logs in the image forming apparatus 1 is described with reference to a flowchart in FIG. 3. FIG. 4 is a diagram illustrating a confirmation screen 91 (a third screen).

The controller 17 carries out a login authentication of a user (ACT 20).

If the logging in of the user is approved (YES in ACT 21), and if there are print data moved to other server areas 41, 153A, that is, the print data associated with the user (YES in ACT 22), the controller 17 displays the confirmation screen 91 on the control panel 14 (ACT 23).

The controller 17 displays a message 911 for asking whether or not to display the print data which are not printed even the given period has passed, an OK button 912 and a cancel button 913 on the confirmation screen 91.

If an input of the OK button 912 (a list displaying instruction) is received (YES in ACT 24), the controller 17 displays the management screen 92 on the control panel 14 (ACT 25).

Figure 5:
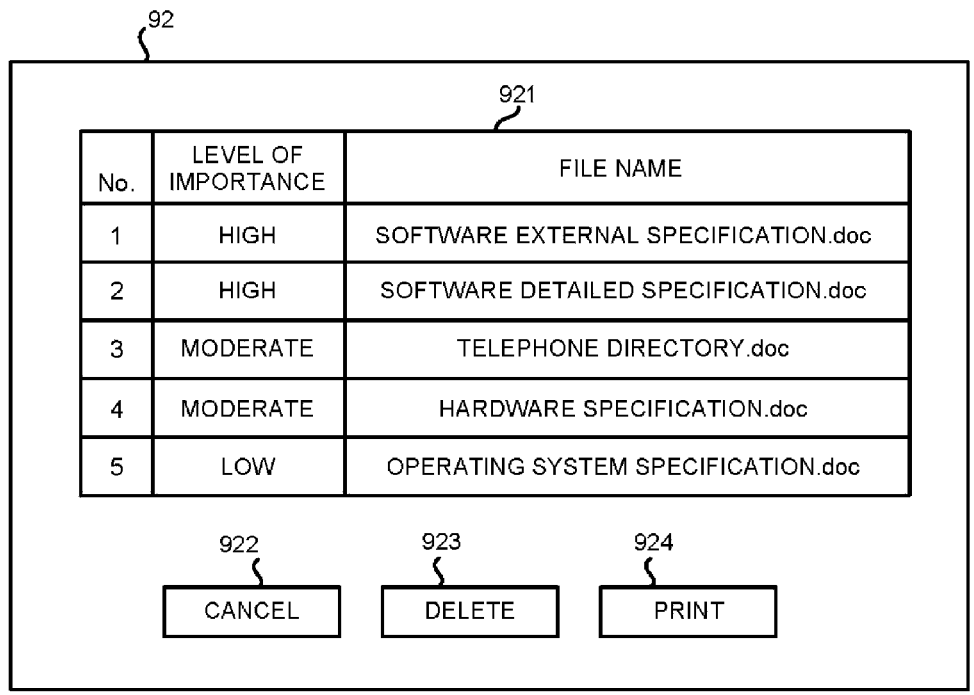
FIG. 5 is a diagram illustrating a management screen.

FIG. 5 is a diagram illustrating the management screen 92 (a first screen, a second screen, a fourth screen and a fifth screen).

The controller 17 displays a print data list 921 in which the print data moved to other server areas 41, 153A are sorted based on the level of importance, a cancel button 922, a delete button 923 and a print button 924 in the management screen 92. In FIG. 5, in the print data list 921, the controller 17 displays the most important print data on the top of the screen; however, it is not limited to this, the controller 17 may also display the least important print data on the top of the screen. Further, the controller 17 displays the level of importance of the print data in association with file names, and displays the print data (level of importance and file name) in a selectable manner.

If a selection of print data and an input of the delete button 923 (deleting instruction) are received (ACT 26: delete), the controller 17 deletes the selected print data in other server areas 41, 153A (ACT 27).

If a selection of print data and an input of the print button 924 (printing instruction) are received (ACT 26: print), the controller 17 acquires the selected print data from other server areas 41, 153A and deletes the print data from other server areas 41, 153A (ACT 28). Then the controller 17 carries out a printing operation based on the selected print data (ACT 29).

If there is no print data associated with the user in other server areas 41, 153A (NO in ACT 22), or if the inputs of the cancel buttons 913, 922 in the confirmation screen 91 and the management screen 92 are received (NO in ACT 24, or ACT 26: cancel), or after the print data moved to other server areas 41, 153A are deleted (ACT 27), or after the printing operation is ended (ACT 29), the controller 17 enables the image forming apparatus 1 to be in a standby state.

Further, dedicated print server areas may also be arranged in the server areas 153, 153A and 41 for storing print data. Then the image forming apparatus 1 may also move the print data to the print server area in the server areas 41, 153A of other apparatuses 4, 1A.

The order of each processing in the embodiment stated above is not limited to this; it may also be different from that exemplified in the embodiment stated above.

As stated above, according to the technology in the present invention, a storage technology of print data can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
a communication section configured to receive print data;
a storage section configured to store print data in a print data area;
an operation section configured to receive an operation input;
an image forming section configured to form an image on a sheet based on the print data if the operation section receives a printing instruction of print data; and
a controller configured to move print data which are not printed even a given period has passed since the print data is received by the communication section from the print data area to other storage area, wherein:
the controller displays, if a user is approved, and if there are print data moved to other storage area, a third screen for receiving a list displaying instruction of the print data moved to other storage area on a display, and displays, if a list displaying instruction is received, a fourth screen for displaying a list of the print data moved to other storage area on the display, and
wherein information representing the level of importance is associated with print data;
the controller sorts and displays, if a list displaying instruction is received, the print data moved to other storage area based on the level of importance in a selectable manner, and displays the fourth screen for receiving a deleting instruction of the selected print data and a printing instruction on the display;
deletes, if a selection of print data and a deleting instruction is received, the selected print data from other storage area; and
acquires, if a selection of print data and a printing instruction is received, the selected print data from other storage area to print the selected print data, and then deletes the selected print data from other storage area.

2. The apparatus according to claim 1, wherein:
other image forming apparatus is connected with the image forming apparatus to be capable of carrying out data communication; and
the controller moves print data to a storage area of other image forming apparatus.

3. The apparatus according to claim 1, wherein:
the controller moves the information representing that print data is moved from the print data area to other storage area in association with the print data.

4. The apparatus according to claim 1, wherein:
the controller carries out a user authentication, displays, if a user is approved, print data moved to other storage area in a selectable manner and a first screen for receiving a printing instruction of the selected print data on a display, acquires, if a selection of print data and a printing instruction is received, the selected print data from other storage area to print the selected print data, and then deletes the selected print data from other storage area.

5. The apparatus according to claim 1, wherein:
the controller displays, if a user is approved, print data moved to other storage area in a selectable manner and a second screen for receiving a deleting instruction of the selected print data on a display, and deletes, if a selection of print data and a deleting instruction is received, the selected print data from other storage area.

6. A storage method of print data based on an image forming apparatus provided with a storage section for storing print data in print data area and an operation section for receiving an operation input, including:
receiving print data;
forming an image on a sheet based on the print data if the operation section receives a printing instruction of print data;
moving the print data which are not printed even a given period has passed since the print data is received from the print data area to other storage area;
displaying, if a user is approved, and if there are print data moved to other storage area, a third screen for receiving a list displaying instruction of the print data moved to other storage area on a display, and displaying, if a list displaying instruction is received, a fourth screen for displaying a list of the print data moved to other storage area on the display, wherein information representing the level of importance is associated with print data;
sorting and displaying, if a list displaying instruction is received, the print data moved to other storage area based on the level of importance in a selectable manner, and displaying the fourth screen for receiving a deleting instruction of the selected print data and a printing instruction on the display;
deleting, if a selection of print data and a deleting instruction is received, the selected print data from other storage area; and
acquiring, if a selection of print data and a printing instruction is received, the selected print data from other storage area to print the selected print data, and then deleting the selected print data from other storage area.

7. The method according to claim 6, wherein:

the image forming apparatus is connected with other image forming apparatus to be capable of carrying out data communication; and print data are moved to a storage area of other image forming apparatus.

\* \* \* \* \*